United States Patent
Tsuji et al.

(10) Patent No.: US 9,499,073 B2
(45) Date of Patent: Nov. 22, 2016

(54) SLIDE RAIL OF VEHICLE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventors: Eiichiro Tsuji, Kariya (JP); Jueru Shimizu, Handa (JP); Wataru Sakaguchi, Kariya (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/821,026

(22) Filed: Aug. 7, 2015

(65) Prior Publication Data

US 2016/0059739 A1 Mar. 3, 2016

(30) Foreign Application Priority Data

Aug. 28, 2014 (JP) .................................. 2014-174370

(51) Int. Cl.
*B60N 2/06* (2006.01)
*B60N 2/07* (2006.01)
*B60N 2/68* (2006.01)
*B60N 2/02* (2006.01)

(52) U.S. Cl.
CPC ............... *B60N 2/067* (2013.01); *B60N 2/06* (2013.01); *B60N 2/07* (2013.01); *B60N 2/0705* (2013.01); *B60N 2/0722* (2013.01); *B60N 2/0727* (2013.01); *B60N 2/682* (2013.01); *B60N 2002/024* (2013.01)

(58) Field of Classification Search
CPC ........ B60N 2/067; B60N 2/07; B60N 2/0722; B60N 2/06; B60N 2/0727
See application file for complete search history.

(56) References Cited

U.S. PATENT DOCUMENTS

| | | | | |
|---|---|---|---|---|
| 4,611,778 A | * | 9/1986 | Werner | .................... F16H 25/24 248/419 |
| 4,805,866 A | * | 2/1989 | Aihara | ................... B60N 2/067 248/429 |
| 5,150,872 A | * | 9/1992 | Isomura | ............... B60N 2/0232 248/429 |
| 5,273,242 A | * | 12/1993 | Mouri | .................... B60N 2/067 248/429 |

(Continued)

FOREIGN PATENT DOCUMENTS

| | | |
|---|---|---|
| DE | 298 14 447 | 8/1998 |
| JP | 5-84526 | 11/1993 |

(Continued)

OTHER PUBLICATIONS

Official Action, along with English-language translation thereof, for DE Appl. No. 10 2015 215 218.9 dated Sep. 8, 2016.

*Primary Examiner* — Eret McNichols

(74) *Attorney, Agent, or Firm* — Greenblum & Bernstein, P.L.C.

(57) ABSTRACT

A slide rail of a vehicle seat includes a first rail to which a screw having a screw thread formed on an outer periphery is fixed; a second rail that retains a nut into which the screw screws, and moves relative to the first rail by the nut rotating; a protruding portion that is provided on the first rail, and protrudes toward the screw; and an elastic member that connects the protruding portion and the screw. The elastic member has a retaining body that retains the screw, and an engaging body that engages with the protruding portion.

8 Claims, 10 Drawing Sheets

(56) References Cited

U.S. PATENT DOCUMENTS

| | | | | |
|---|---|---|---|---|
| 5,342,013 A * | 8/1994 | Ito | B60N 2/067 | 248/424 |
| 5,762,309 A * | 6/1998 | Zhou | B60N 2/442 | 248/429 |
| 5,823,499 A * | 10/1998 | Ito | B60N 2/067 | 248/429 |
| 6,138,974 A * | 10/2000 | Okada | B60N 2/067 | 248/429 |
| 6,220,642 B1 * | 4/2001 | Ito | B60N 2/0232 | 248/429 |
| 6,260,922 B1 * | 7/2001 | Frohnhaus | B60N 2/067 | 248/424 |
| 6,290,199 B1 * | 9/2001 | Garrido | B60N 2/0232 | 248/424 |
| 6,820,851 B2 * | 11/2004 | Mochizuki | B60N 2/067 | 248/429 |
| 6,959,900 B2 * | 11/2005 | Hoshihara | B60N 2/067 | 248/424 |
| 6,971,620 B2 * | 12/2005 | Moradell | B60N 2/067 | 248/422 |
| 7,051,986 B1 * | 5/2006 | Taubmann | B60J 7/0573 | 248/429 |
| 7,143,513 B2 * | 12/2006 | Taubmann | B60J 7/0573 | 248/429 |
| 7,303,223 B2 * | 12/2007 | Nakamura | B60N 2/0232 | 248/429 |
| 7,407,214 B2 * | 8/2008 | Long | B60N 2/067 | 248/429 |
| 7,437,962 B2 * | 10/2008 | Taubmann | B60J 7/0573 | 248/429 |
| 7,503,537 B2 * | 3/2009 | Koga | B60N 2/0232 | 248/419 |
| 7,571,666 B2 * | 8/2009 | Borbe | B60N 2/0232 | 297/344.1 |
| 7,597,303 B2 * | 10/2009 | Kimura | B60N 2/067 | 248/424 |
| 7,641,164 B2 * | 1/2010 | Nakamura | B60N 2/0232 | 248/422 |
| 7,658,429 B2 * | 2/2010 | Koga | B60N 2/067 | 248/429 |
| 8,038,197 B2 * | 10/2011 | Koga | B60N 2/067 | 296/65.18 |
| 8,226,063 B2 * | 7/2012 | Weber | B60N 2/067 | 248/429 |
| 8,439,324 B2 * | 5/2013 | Hake | B60N 2/067 | 248/424 |
| 8,469,432 B2 * | 6/2013 | Couasnon | B60N 2/067 | 248/503.1 |
| 8,523,263 B2 * | 9/2013 | Kimura | B60N 2/0705 | 248/429 |
| 8,820,694 B2 * | 9/2014 | Tarusawa | B60N 2/067 | 248/429 |
| 9,145,068 B2 * | 9/2015 | Bosecker | B60N 2/067 | 248/429 |
| 2008/0023613 A1 * | 1/2008 | Brewer | B60N 2/0232 | 248/429 |
| 2009/0243327 A1 * | 10/2009 | Koga | B60N 2/067 | 296/65.15 |
| 2010/0013284 A1 * | 1/2010 | Koga | B60N 2/067 | 297/344.1 |
| 2010/0044542 A1 * | 2/2010 | Koga | B60N 2/067 | 248/429 |
| 2010/0065708 A1 * | 3/2010 | Koga | B60N 2/067 | 248/429 |
| 2010/0219813 A1 * | 9/2010 | Ito | B60N 2/0232 | 324/207.22 |
| 2010/0288903 A1 * | 11/2010 | Koga | B60N 2/0232 | 248/429 |
| 2011/0031774 A1 * | 2/2011 | Koga | B60N 2/067 | 296/65.15 |
| 2013/0186217 A1 * | 7/2013 | Enokijima | B60N 2/067 | 74/89.33 |

FOREIGN PATENT DOCUMENTS

| | | | | |
|---|---|---|---|---|
| JP | 7-232578 | 9/1995 | | |
| JP | 2004-345586 | 12/2004 | | |
| JP | 2005-96521 | 4/2005 | | |
| WO | WO 2009047948 A1 * | 4/2009 | | B60N 2/067 |

* cited by examiner

SLIDE RAIL OF VEHICLE SEAT

INCORPORATION BY REFERENCE

The disclosure of Japanese Patent Application No. 2014-174370 filed on Aug. 28, 2014 including the specification, drawings and abstract is incorporated herein by reference in its entirety.

BACKGROUND OF THE INVENTION

1. Field of the Invention

The invention relates to a slide rail of a vehicle seat, and more particularly, to a slide rail of a vehicle seat, which includes a first rail to which a screw having a screw thread formed on an outer periphery is fixed, and a second rail that retains a nut that screws onto the screw, and that is configured to move relative to the first rail by the nut rotating.

2. Description of Related Art

The technology described in Japanese Utility Model Application Publication No. 5-84526 (JP 5-84526 U), for example, is one known example of such a slide rail of a vehicle seat. In this related art, when a motor is driven, an upper rail electrically slides on a lower rail by a nut that is fixed to the upper rail moving relative to a screw that is rotatably assembled to the lower rail and screwed into the nut. With this structure, as shown in FIG. 9, a screw 136 is assembled to a bracket 180 that is fastened to the lower rail 110, with a rear end of the screw 136 inserted through a bearing hole 182 in the bracket 180. At this time, a rubber damper 184 is fitted onto a peripheral edge of the bearing hole 182. As a result, rattling of the screw 136 against the bracket 180 is able to be absorbed. Therefore, abnormal noise generated when electrically sliding the vehicle seat is able to be suppressed.

SUMMARY OF THE INVENTION

However, with the technology described in JP 5-84526 U above, the rubber damper 184 is assembled in a manner fitted onto the peripheral edge of the bearing hole 182 of the bracket 180, as is also evident from FIG. 10. Therefore, the screw 136 is inserted through the bearing hole 182 in the bracket and a through-hole 184a in the rubber damper 184. Thus, the deflectable amount that the rubber damper 184 is able to bend may end up decreasing. As a result, if the amount of rattling (vibration) generated in the screw 136 is large, this large amount of rattling may be unable to be absorbed.

The invention thus provides a slide rail of a vehicle seat that includes a first rail to which a screw having a screw thread formed on an outer periphery is fixed, and a second rail that retains a nut that screws onto the screw, and that is configured to move relative to the first rail by the nut rotating. This slide rail of a vehicle seat is able to absorb rattling generated in the screw, even if the amount of this rattling is large.

An aspect of the invention relates to a slide rail of a vehicle seat includes a first rail to which a screw having a screw thread formed on an outer periphery is fixed; a second rail that retains a nut into which the screw screws, and moves relative to the first rail by the nut rotating; a protruding portion that is provided on the first rail, and protrudes toward the screw; and an elastic member that connects the protruding portion and the screw. The elastic member has a retaining body that retains the screw, and an engaging body that engages with the protruding portion.

According to this aspect, the screw is connected to the protruding portion via the elastic member. That is, the screw is not directly restricted by the protruding portion. Therefore, unlike the related art, the deflectable amount that enables the elastic member to bend will not end up decreasing (in other words, the deflectable amount that the elastic member is able to bend will increase). As a result, even if the amount of rattling with the screw is large, this large amount of rattling is able to be absorbed.

Also, in the slide rail of the aspect described above, the protruding portion may have a general L-shape that includes a bottom piece and a rising piece having a through-hole, a protrusion may be formed on the engaging body of the elastic member, and the elastic member may be assembled to the protruding portion by the protrusion being inserted into the through-hole in the rising piece of the protruding portion.

According to this structure, the elastic member is assembled to the protruding portion via the insertion of the protrusion. Therefore, this assembly is able to be performed easily.

Also, in the slide rail having the structure described above, when the elastic member is assembled to the protruding portion, the retaining body of the elastic member may be in a state supported by an upper edge of the rising piece of the protruding portion.

According to this structure, the elastic member is supported at two points (i.e., the protrusion and the arcuate portion) with respect to the protruding portion, so compared to when the elastic member is supported at only one point (i.e., the protrusion), a load applied by an occupant seated on a seat cushion is able to be dispersed. As a result, the elastic member is able to last for a long time.

Also, in the slide rail having the structure described above, when the elastic member is assembled to the protruding portion, the retaining body of the elastic member may be in a state protruding from the rising piece of the protruding portion toward a side opposite a side where the elastic member is assembled to the rising piece.

According to this structure, the protruding portion does not protrude out from the elastic member. Therefore, harm caused by this protruding portion is able to be inhibited. Also, the appearance of the protruding portion with the protrusion of the elastic member inserted into the through-hole in the rising piece is able to be improved.

Also, in the slide rail having the structure described above, the elastic member may be formed with the retaining body and the engaging body lined up.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
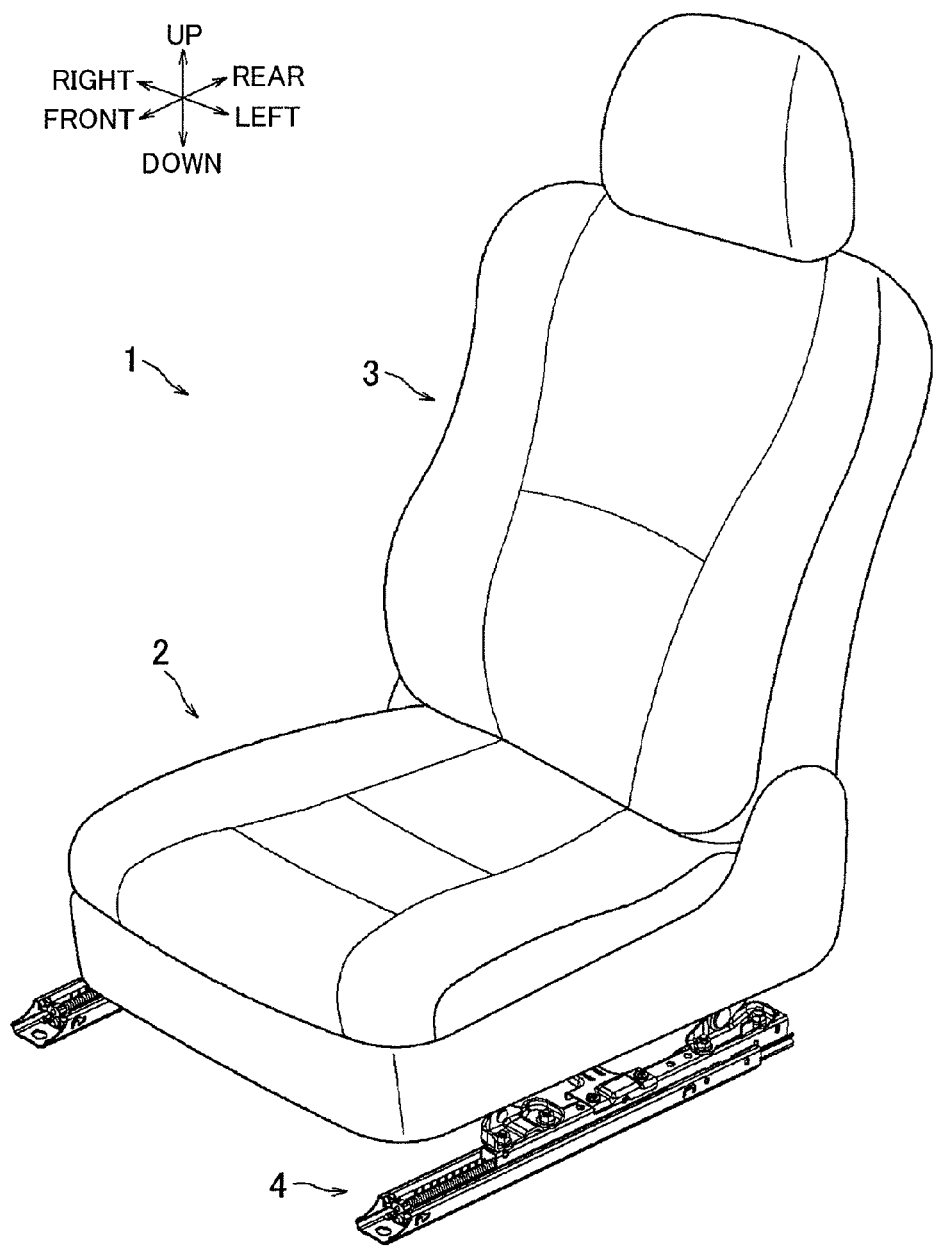
FIG. 1 is an overall perspective view of a vehicle seat according to an example embodiment of the invention.

Hereinafter, modes for carrying out the invention will be described with reference to FIGS. 1 to 8. In the description below, a "vehicle seat 1" will be described as an example of the vehicle seat of the invention. Also, in the description below, up, down, front, rear, left, and right indicate directions of up, down, front, rear, left, and right in the drawings, i.e., directions of up, down, front, rear, left, and right when the vehicle seat 1 is in a state arranged inside a vehicle, not shown, such as an automobile.

First, the structure of the vehicle seat 1 will be described with reference to FIG. 1. This vehicle seat 1 is formed by a seat cushion 2, a seatback 3, and a power slide device 4. Of the seat cushion 2, the seatback 3, and the power slide device 4, the seat cushion 2 and the seatback 3 are well-known, so only the power slide device 4 will be described below.

Figure 2:
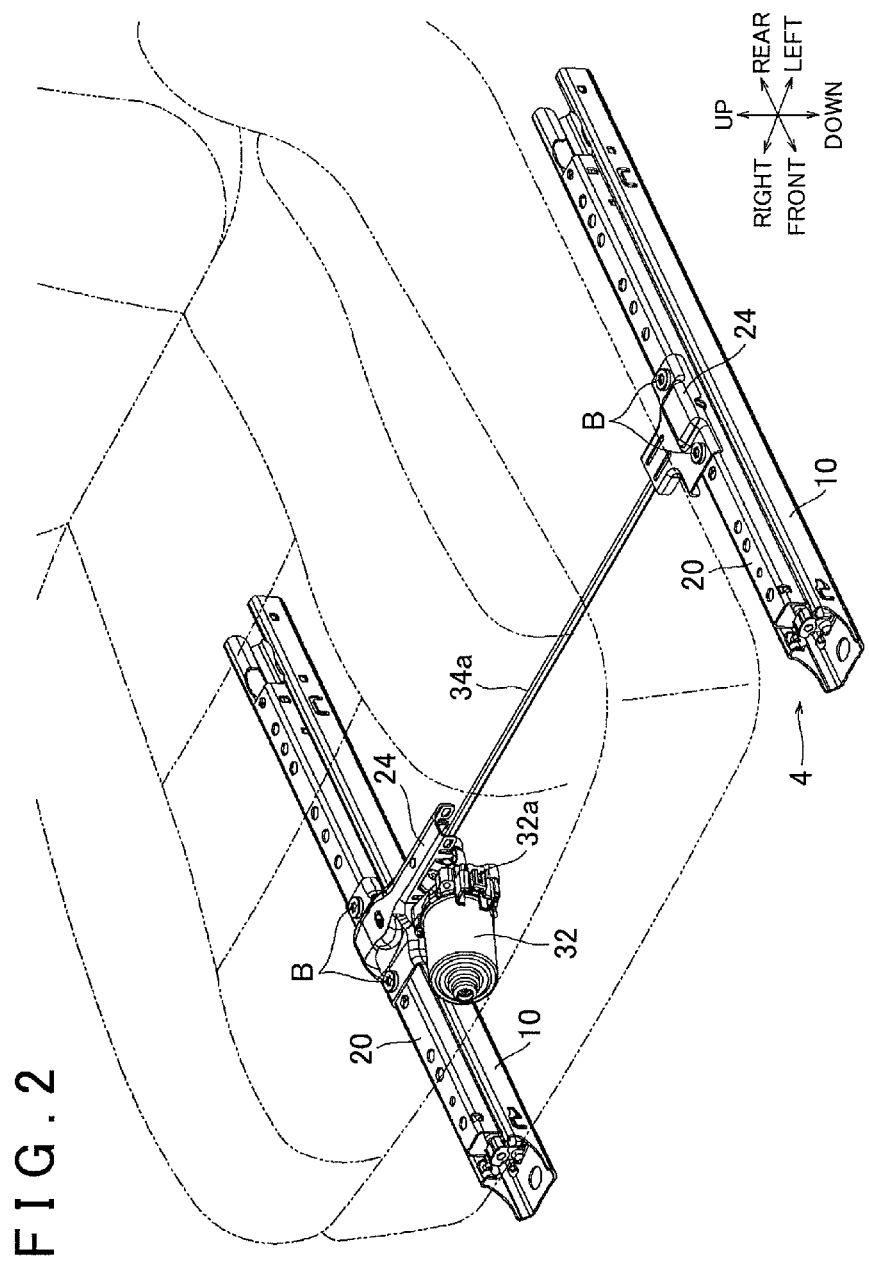
FIG. 2 is an enlarged view of a power slide device shown in FIG. 1.
Figure 3:
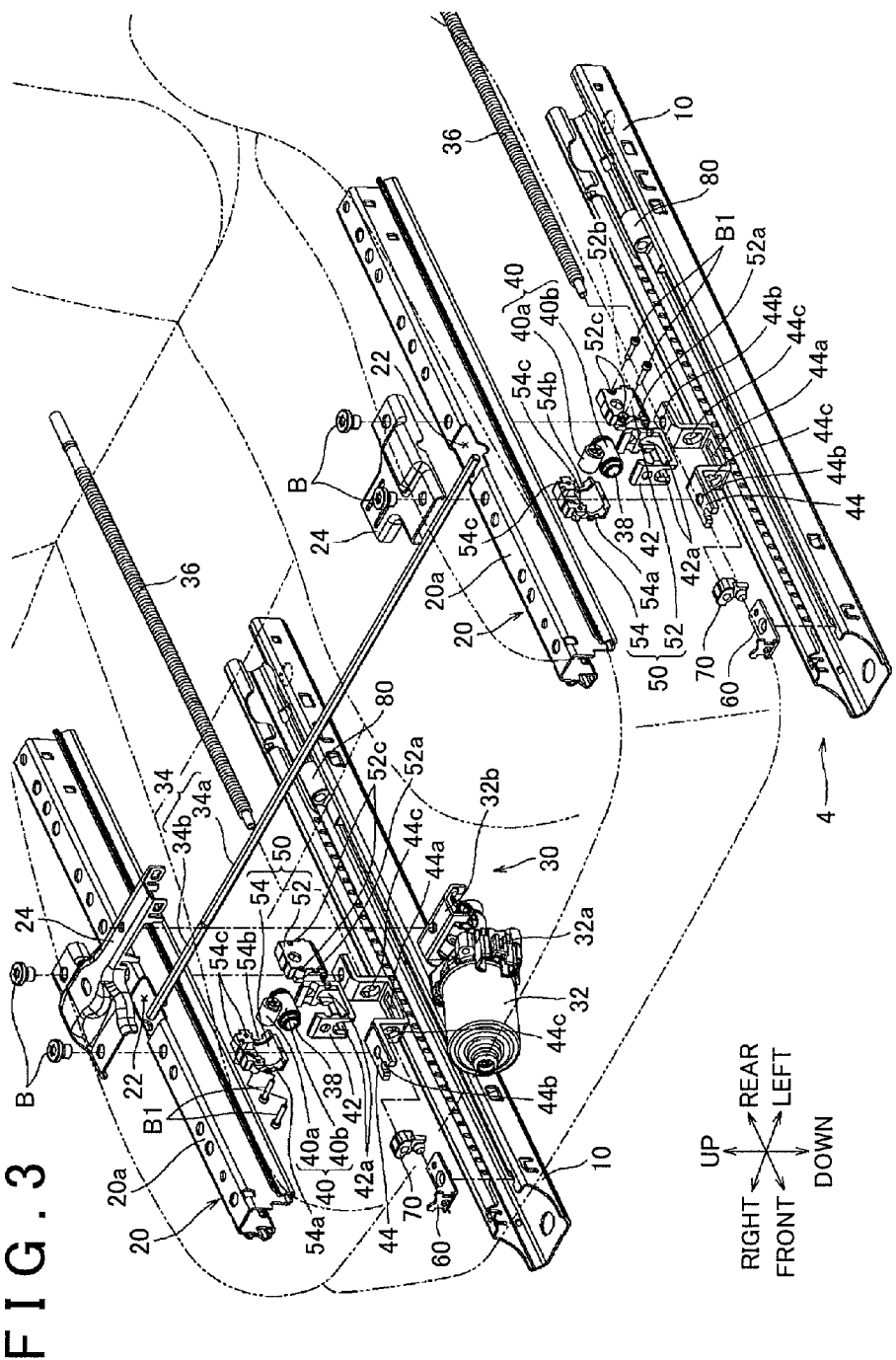
FIG. 3 is an exploded view of FIG. 2.
Figure 4:
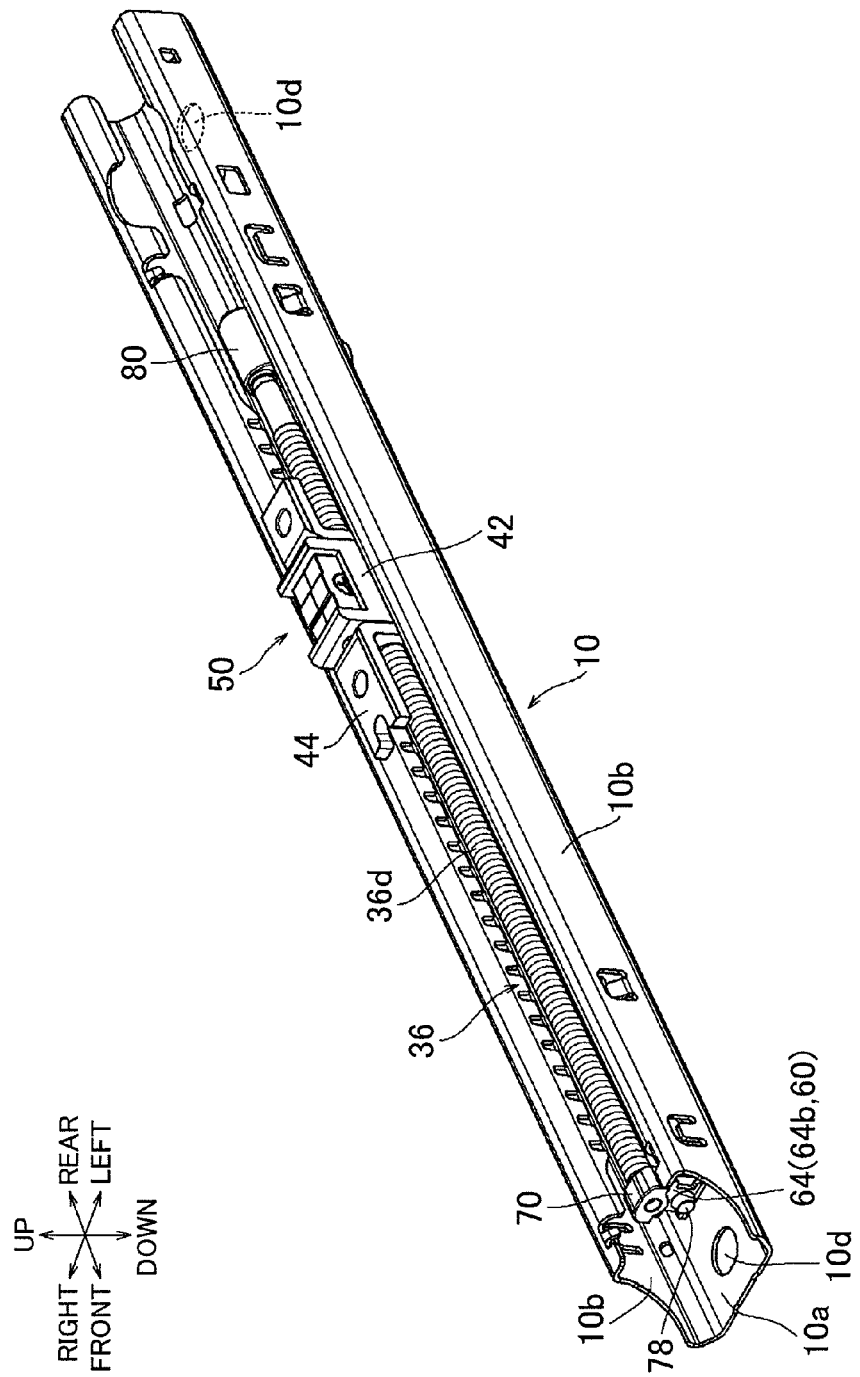
FIG. 4 is an enlarged view of a left lower rail in FIG. 3.
Figure 5:
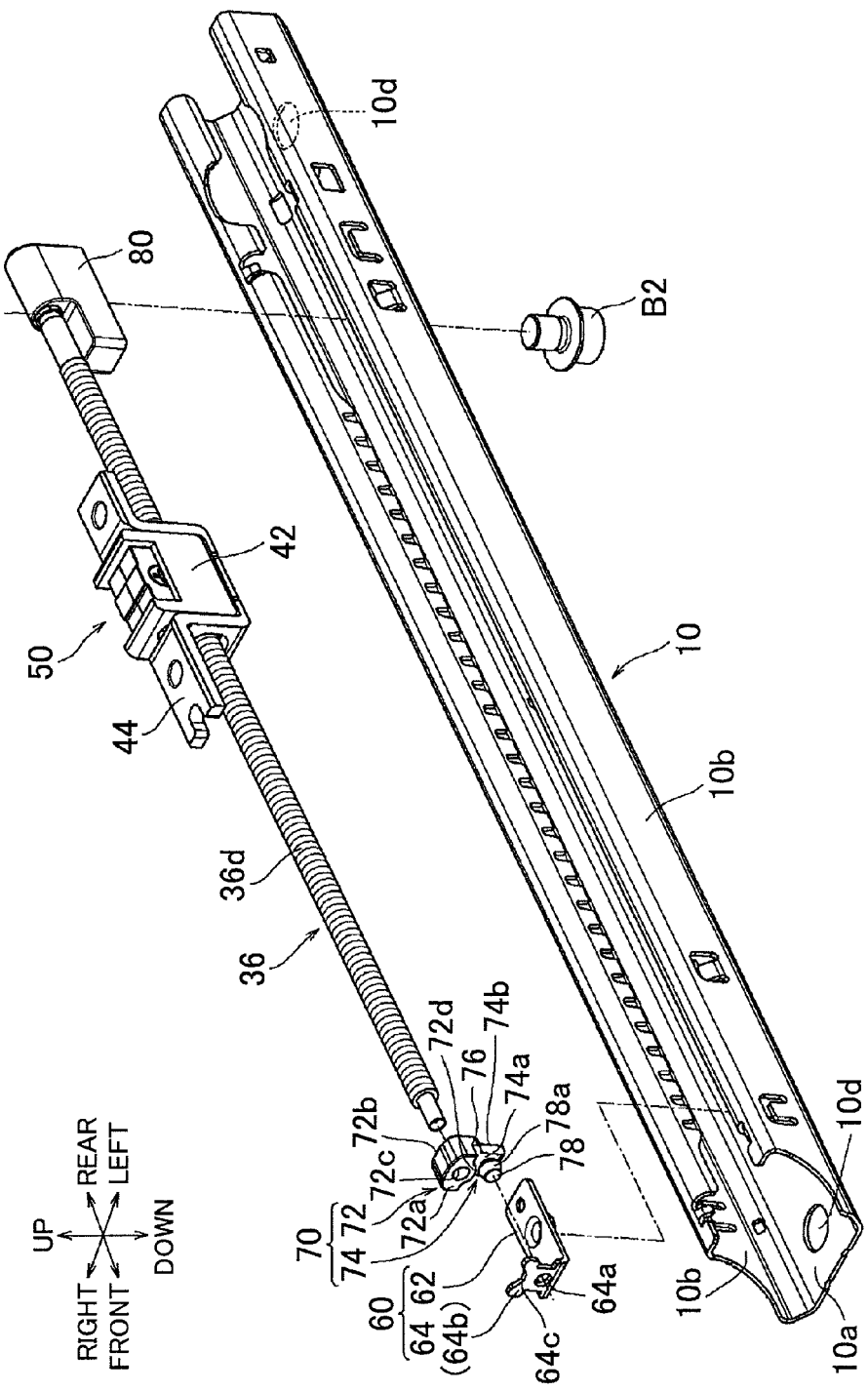
FIG. 5 is an exploded view of FIG. 4.
Figure 6:
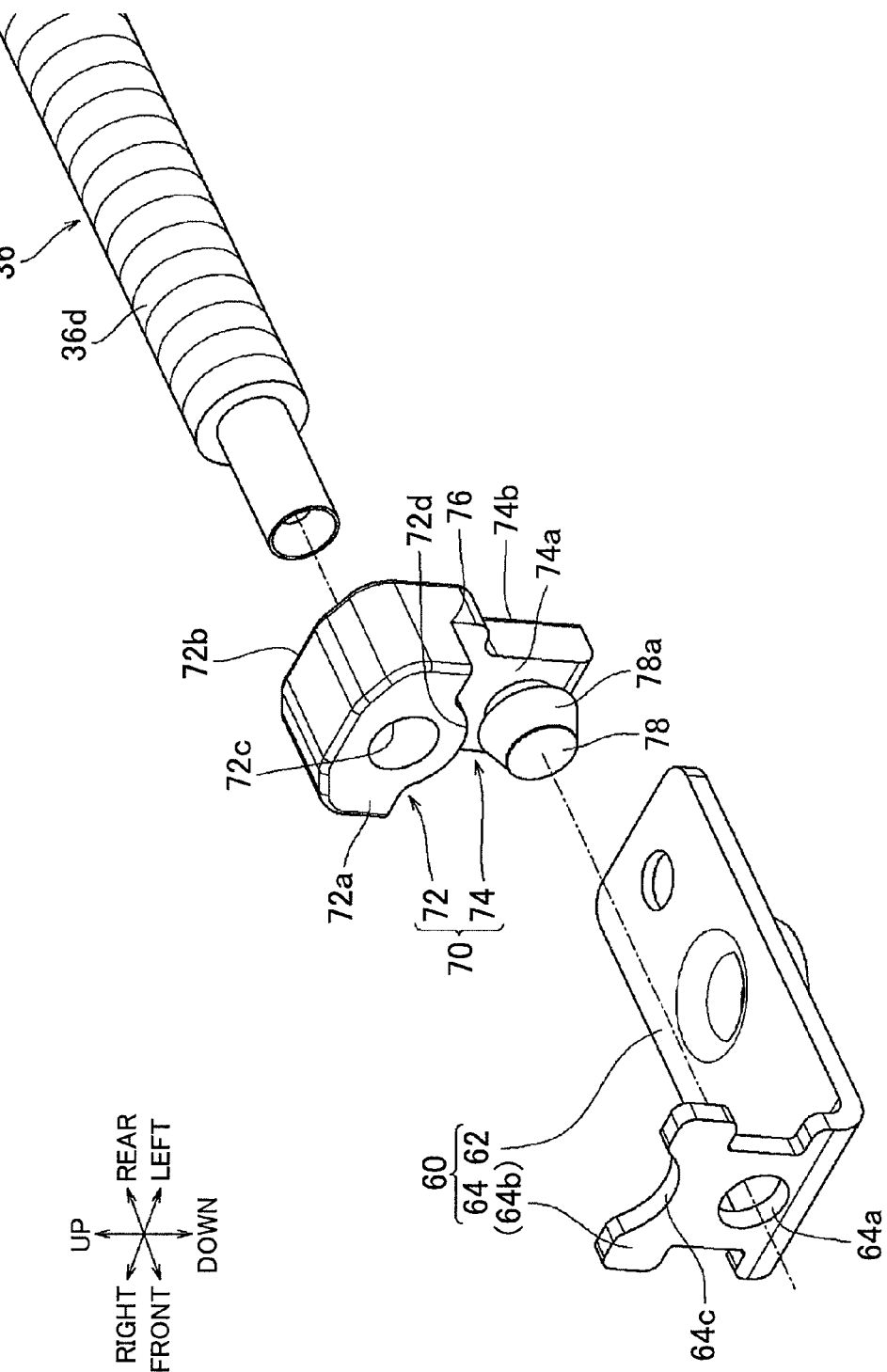
FIG. 6 is an enlarged view of the main portions in FIG. 5.
Figure 7:
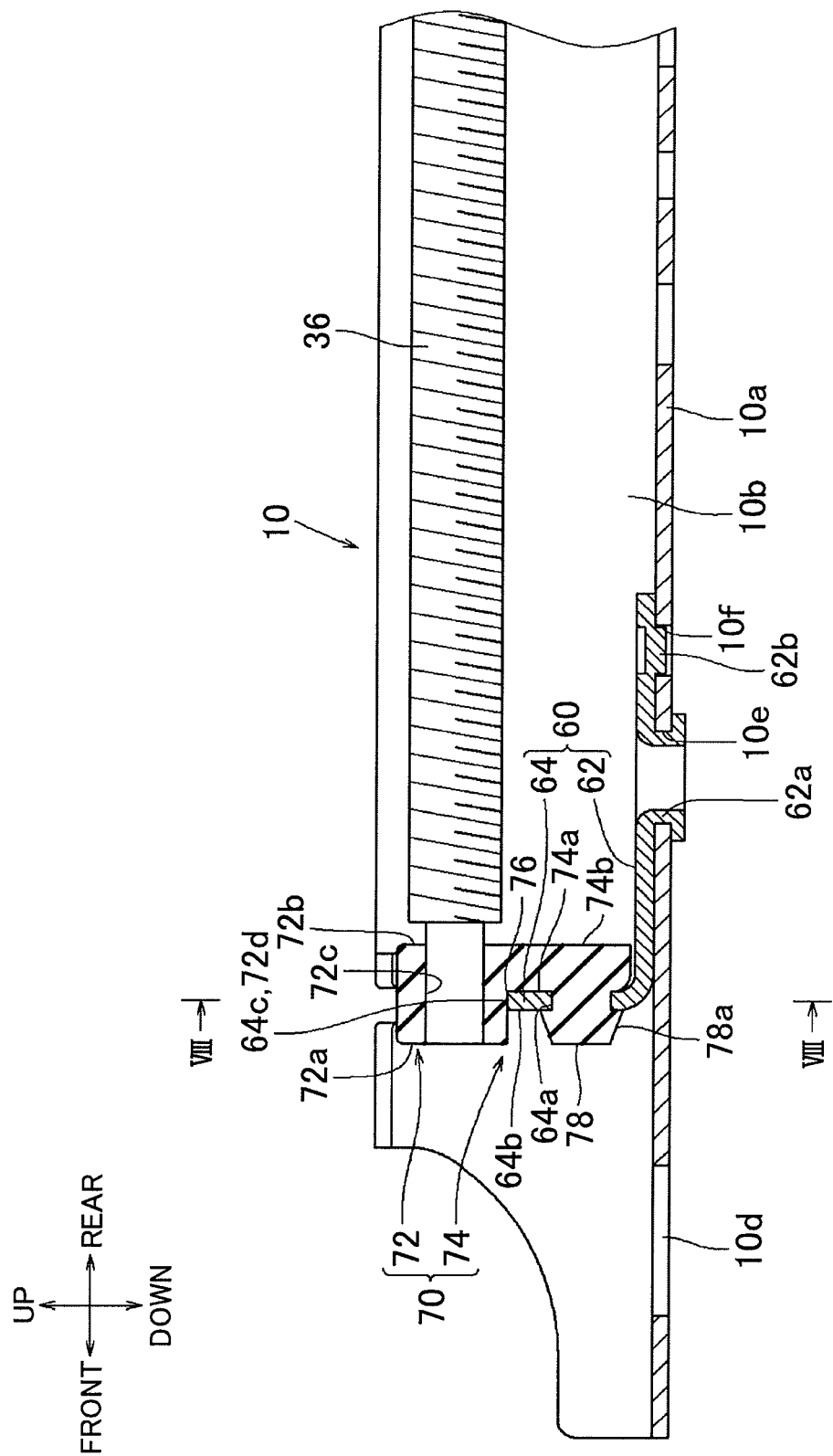
FIG. 7 is a longitudinal sectional view of the front end side in FIG. 4.

As shown in FIGS. 2 and 3, the power slide device 4 includes left and right lower rails 10 assembled to a floor of the vehicle (neither of which is shown), left and right upper rails 20 slidably assembled to the left and right lower rails 10, and an electric drive mechanism 30 that electrically slides the left and right upper rails 20 on the left and right lower rails 10. Hereinafter, the left and right lower rails 10, the left and right upper rails 20, and the electric drive mechanism 30 will be described individually. In the description below, portions provided in plurality, such as the lower rails 10 and the upper rails 20, may be described in the singular to simplify the description and facilitate understanding.

Figure 8:
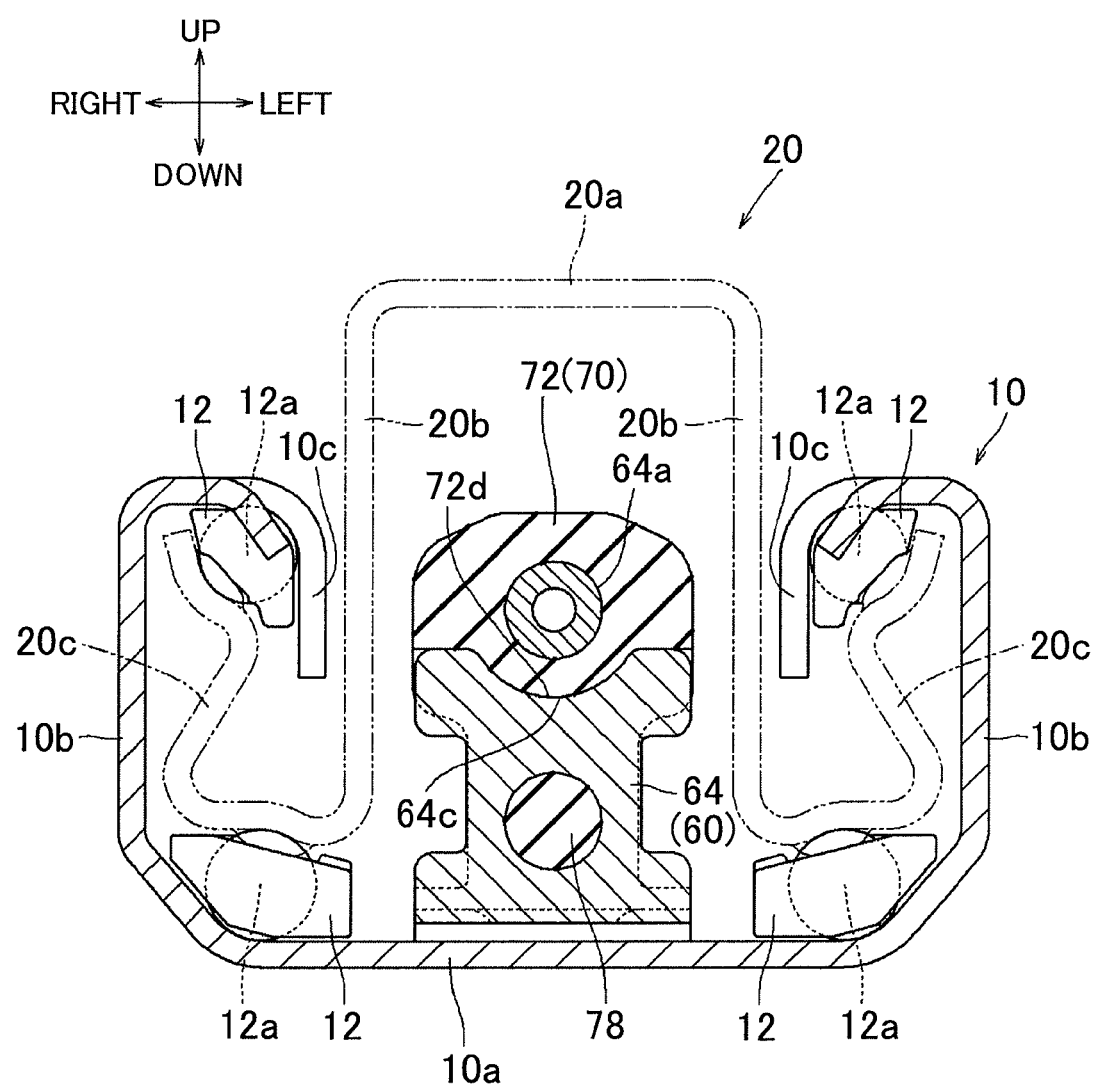
FIG. 8 is a sectional view taken along line VIII-VIII in FIG. 7.
Figure 9:
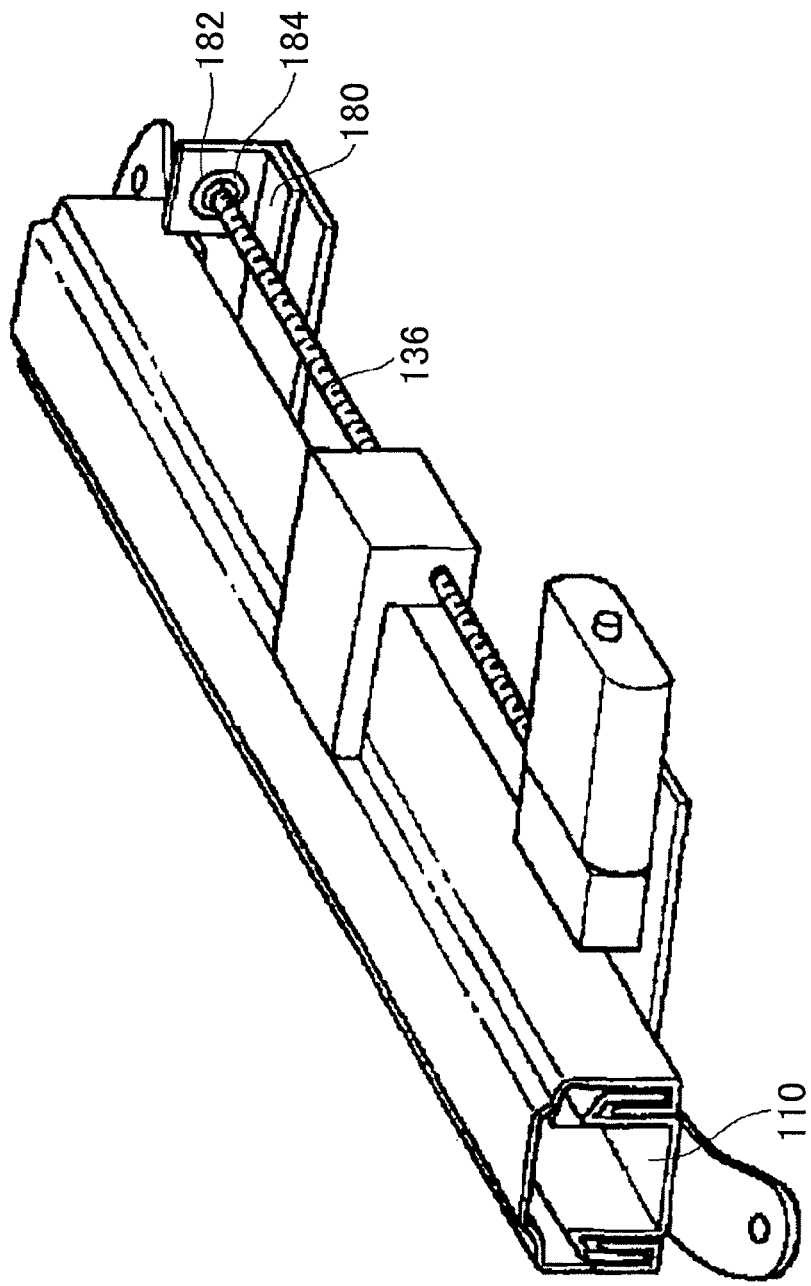
FIG. 9 is an enlarged view of a power slide device according to related art.
Figure 10:
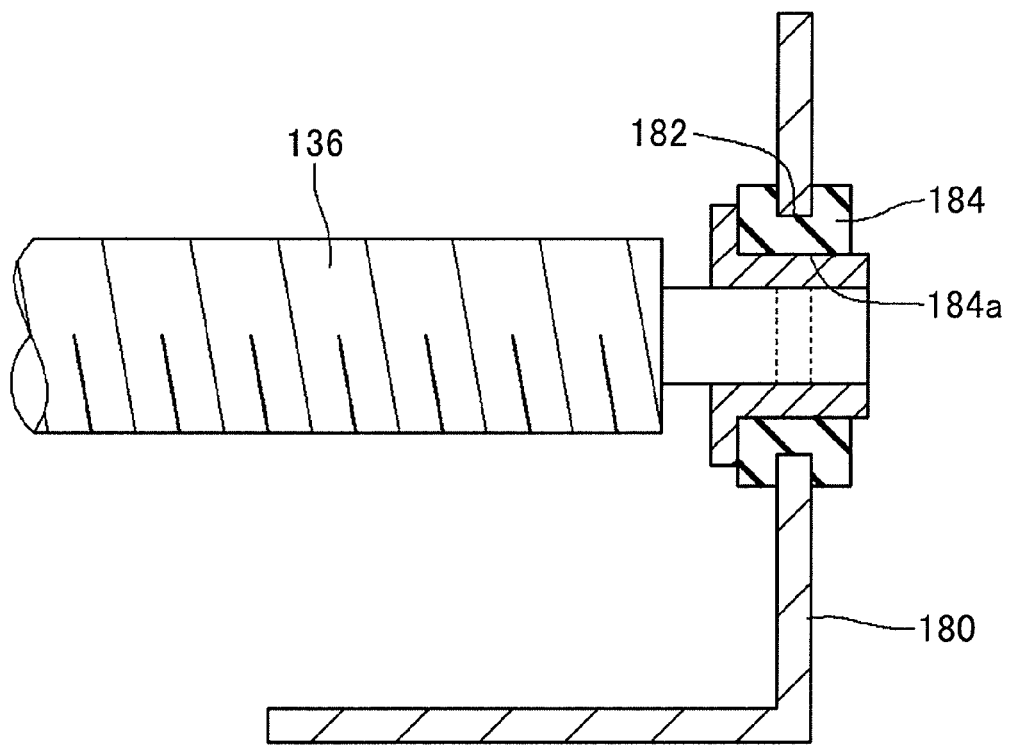
FIG. 10 is a longitudinal sectional view of the front end side in FIG. 9.

First, the lower rail 10 will be described (see FIG. 8). This lower rail 10 is formed in a long shape that extends in a front-rear direction of the vehicle, not shown. This lower rail 10 includes a bottom surface 10a, left and right side surfaces 10b that rise up from the left and right of the bottom surface 10a, and left and right falling surfaces 10c that fall in a direction toward each other from upper edges of the left and right side surfaces 10b. A long resin shoe 12 that has a plurality of (e.g., four) rigid spheres 12a is assembled, so as to be able to slide in the length direction, on the inside surface of this lower rail 10. This resin shoe 12 is fixed at substantially four corners of the inside surface of the lower rail 10. As a result, when the upper rail 20 slides on the lower rail 10, the sliding action is able to be smooth.

Also, insertion holes 10d into which bolts, not shown, are able to be inserted, are formed in both ends (front and rear ends) of the lower rail 10. These insertion holes 10d are formed corresponding to mounting holes, not shown, formed in the vehicle floor, also not shown. A nut, not shown, is fixed to an edge of the mounting hole, on the side opposite the vehicle floor side. Thus, the lower rail 10 is able to be fastened to the floor by inserting the bolts, not shown, into the insertion holes 10d in the lower rail 10 and screwing these inserted bolts into the nuts. This lower rail 10 is formed in a pair, with one on the left and one on the right. The lower rail 10 is formed as described above.

Next, the upper rail 20 will be described (see FIG. 8). This upper rail 20 is also formed in a long shape that extends in the front-rear direction of the vehicle, not shown, similar to the lower rail 10 described above. This upper rail 20 also includes an upper surface 20a, left and right side surfaces 20b that fall from the left and right of this upper surface 20a, and left and right rising surfaces 20c that rise in a direction away from each other from lower edges of these left and right side surfaces 20b. The upper rail 20 is assembled to the lower rail 10 so as to be able to slide in the length direction. Also, an opening 22 is formed in the upper surface 20a of this upper rail 20. This opening 22 is for fastening another end of a shaft 34 to a worm gear 40a of a gear subassembly 40 that is housed in a recess 44a of a holder 44, described later, that is assembled inside of this upper rail 20, as will be described later.

This opening 22 is covered by a generally T-shaped cover 24. At this time, screws B that fasten this cover 24 pass through the upper rail 20 and are fastened to the holder 44, described later, that is assembled inside the upper rail 20. This fastening is accomplished by screwing the screw B onto an internal thread, not shown, in a screw hole 44b formed in the holder 44. When the screw B is able to be screwed onto an internal thread in the screw hole 44b in this way, there is no need for a mating member, such as a nut, for fastening this screw B. Therefore, a tip end of the screw B is able to be prevented from protruding out from the holder 44. Consequently, the tip end of the screw B able to be prevented from interfering with a screw 36 that will be described in later. In this way, the cover 24 is assembled to an upper surface of the upper rail 20 by the screws B, and the holder 44 is assembled inside the upper rail 20. This upper rail 20 is also formed in a pair, with one on the left and one on the right, similar to the lower rail 10. The upper rail 20 is formed as described above.

Lastly, the electric drive mechanism 30 will be described. The electric drive mechanism 30 includes a motor 32, a shaft 34 that includes a left shaft 34a and a right shaft 34b, left and right screws 36 having a screw thread 36d formed on an outer periphery, left and right nuts 38, and left and right gear subassemblies 40 each having a worm gear 40a and a wheel gear 40b. A reduction gear unit 32a having a mounting bracket 32b is provided with the motor 32. This mounting bracket 32b is fastened to a tip end of the right cover 24, described later, by crimping.

The left shaft 34a is connected at one end to the reduction gear unit 32a, and is fastened at the other end to the worm gear 40a of the left gear subassembly 40. Meanwhile, the right shaft 34b is connected at one end to the reduction gear unit 32a, and is fastened at the other end to the worm gear 40a of the right gear subassembly 40, similar to the left shaft 34a. The left screw 36 is fixed inside the left lower rail 10.

Here, the specific manner in which the left screw 36 is fixed inside the left lower rail 10 will be described in detail with reference to FIGS. 4 to 7. A front end of the left screw 36 is fixed inside the left lower rail 10 via a front bracket 60 and a rubber damper 70. The front bracket 60 is integrally formed so as to form a general L-shape by a bottom piece 62 and a rising piece 64 that has a through-hole 64a. When integrally formed in this way, the front bracket 60 achieves two functions with a single member. More specifically, as the first function, a flange 62a is formed on the bottom piece 62, so the front bracket 60 is able to be fastened by crimping to the bottom surface 10a of the left lower rail 10 via this flange 62a, as will be described later. Also, as the second function, the through-hole 64a is formed in the rising piece 64, so an engaging body 74 of the rubber damper 70 is able to engage with this through-hole 64a, as will be described later. A recessed portion 64c that is recessed in an arc-shape is formed on an upper edge of this rising piece 64. This front bracket 60 is an example of a protruding portion described in the scope of the claims.

Also, the rubber damper 70 includes a retaining body 72 that has a through-hole 72c passing between a front surface 72a and a rear surface 72b of the rubber damper 70, which is able to accept and retain the screw 36, and an engaging body 74 that has a generally conical protrusion 78 that is lined up with a bottom side of the retaining body 72 and is able to engage with the front bracket 60. The through-hole 72c in the retaining body 72 is formed to be able to accept a front end of the left screw 36 (i.e., such that the front end of the left screw 36 is able to be inserted into the through-hole 72c). Also, a front surface 74a of this engaging body 74 is recessed via a step 76 from the front surface 72a of the retaining body 72 (see FIGS. 6 and 7). Therefore, the engaging body 74 is thinner than the retaining body 72 in the front-rear direction. Therefore, the retaining body 72 is able to easily bend with respect to the engaging body 74.

An arcuate portion 72d that protrudes in an arc-shape so as to correspond to the recessed portion 64c of the front bracket 60 when the rubber damper 70 (i.e., the engaging body 74) is assembled to the front bracket 60, is formed on a lower edge of the front side of the retaining body 72. As a result, when the rubber damper 70 is assembled to the front bracket 60, the arcuate portion 72d of the assembled rubber damper 70 is supported by the recessed portion 64c of the front bracket 60. Also, a recessed depth of the front surface 74a (a recessed surface) of this engaging body 74 is set greater than the thickness of the rising piece 64 of the front bracket 60 (see FIG. 7).

Further, a protrusion 78 of the engaging body 74 is formed so as to be able to be inserted into the through-hole 64a of the rising piece 64. A hook 78a of which a base end protrudes toward a tip end thereof to form a point is formed in a circumferential direction on an outer peripheral surface of this protrusion 78. Also, when the protrusion 78 is inserted into the through-hole 64a of the rising piece 64, the hook 78a of the inserted protrusion 78 is pushed against the edge of the through-hole 64a and is deflected. The deflected hook 78a soon passes beyond the edge of the through-hole 64a of the rising piece 64, and when this happens, the deflection in the hook 78a will be restored and the hook 78a will catch on the edge of the through-hole 64a of the rising piece 64. As a result, the engaging body 74 of the rubber damper 70 is able to engage with the rising piece 64 of the front bracket 60. The rubber damper 70 that is engaged in this way is arranged inside of the left upper rail 20. Therefore, this rubber damper 70 will not interfere with the left upper rail 20 (see FIG. 8). The protrusion 78 of the engaging body 74 is able to be inhibited from easily coming out of the through-hole 64a in the rising piece 64 by having this protrusion 78 be the hook 78a.

The bottom piece 62 of the front bracket 60 to which the protrusion 78 of the engaging body 74 is engaged in this way is fastened by crimping to a front side inside of the left lower rail 10. Here, this crimping will be described in detail. A flange 62a that has undergone a burring process is formed on the bottom piece 62 of the front bracket 60. Also, this flange 62a is inserted into a mounting hole 10e formed in the bottom surface 10a of the lower rail 10. When this insertion is complete, the tip end of the inserted flange 62a is crimped such that it expands outward in the radial direction. In this way, the bottom piece 62 of the front bracket 60 is crimped to the bottom surface 10a of the lower rail 10.

At this time, a protrusion 62b formed on the bottom piece 62 of the front bracket 60 is inserted into a mounting hole 10f formed in the bottom surface 10a of the lower rail 10. Therefore, the front bracket 60 is able to be prevented from rotating with respect to the bottom surface 10a of the lower rail 10, even when crimping is performed as described above. When the protrusion 78 of the rubber damper 70 is engaged with the through-hole 64a of the rising piece 64 of the front bracket 60 as described above, a surface 64b of the rising piece 64 is positioned so as to form a recess from (i.e., is set back from) the front surface 72a of the retaining body 72 of the rubber damper 70. Therefore, the retaining body 72 is in a state protruding forward in a manner covering the rising piece 64. Also, when the protrusion 78 of the rubber damper 70 is engaged with the through-hole 64a of the rising piece 64 of the front bracket 60 as described above, this engaged rubber damper 70 is arranged inside the left lower rail 10, and even if the left upper rail 20 slides, the engaged rubber damper 70 is positioned inside of this left upper rail 20 that has been slid (see FIG. 8).

Meanwhile, a rear bracket 80 is fastened by a bolt B2 to a rear side inside the left lower rail 10, unlike the front bracket 60. After the rear bracket 80 has been fastened in this way, a rear end of the left screw 36 is screwed into a through-hole 82 in the rear bracket 80, and a front end of the left screw 36 is inserted into a through-hole 70a in the rubber damper 70 that has been assembled to the fastened front bracket 60, while the left screw 36 is screwed into the left nut 38. The fixing of the left screw 36 to the left lower rail 10 is complete when the left screw 36 has been completely screwed in and inserted. The right screw 36 is also fixed inside the right lower rail 10, similar to the left screw 36.

Also, when the left screw 36 is screwed into the left nut 38, as described above, this left screw 36 that is to be screwed is inserted through through-holes 42a and 44c (52a, 52b, 54a, and 54b) formed in a damper rubber 42, the holder 44, and a left housing 50 that will be described later. Also, when the screwing in is complete, an internal thread formed on an inside surface of this left nut 38 is in mesh with an external thread formed on an outer surface of the left screw 36. Therefore, when this left nut 38 is rotated, the left screw 36 is able to move forward and backward relative to the left nut 38. The wheel gear 40b of the left gear subassembly 40 is formed on an outside surface of this left nut 38. That is, the left nut 38 and the wheel gear 40b are integrally formed. Therefore, when the wheel gear 40b is rotated, the left screw 36 is able to move forward and backward relative to this left nut 38. Meanwhile, the right nut 38 is also assembled in a state screwed onto the right screw 36, similar to the left nut 38. The wheel gear 40b of the right gear subassembly 40 is formed on an outside surface of this right nut 38.

The worm gear 40a of the left gear subassembly 40 is fastened to the other end of the left shaft 34a, as described above. The worm gear 40a and the wheel gear 40b of this left gear subassembly 40 are connected together such that their rotational axes are orthogonal to one another. Meanwhile, the worm gear 40a of the right gear subassembly 40 is fastened to the other end of the right shaft 34b, as described above, similar to the worm gear 40a of the left gear subassembly 40. The worm gear 40a and the wheel gear 40b of this right gear subassembly 40 are connected together such that their rotational axes are orthogonal to one another.

The left and right gear subassemblies 40 structured in this way are retained in left and right housings 50. These left and right housings 50 will now be described. The left and right housing 50 and the assembly structures thereof are left-right symmetrical, so only the left housing 50 will be described. A description of the right housing 50 will be omitted.

The left housing 50 includes a left case 52 and a right case 54. These left and right cases 52 and 54 have a split construction, and are able to be assembled with screws B1. Through-holes 52c that these screws B1 are able to be inserted into, and screw holes 54c that have internal threads that these screws B1 screw into, are formed in the left and right cases 52 and 54. Therefore, when these cases 52 and 54 are assembled via the screws B1, the left housing 50 that is able to retain the left gear subassembly 40 described above is finished. Semicircular notches 52a, 52b, 54a, and 54b are formed in advance in the left and right cases 52 and 54 such that a through-hole into which the left screw 36 is able to be inserted is formed in the finished left housing 50. Each of these left and right cases 52 and 54 is integrally formed from a rigid synthetic resin by injection molding.

The left housing 50 made from these left and right cases 52 and 54 is housed in the recess 44a of the U-shaped left holder 44 via the left damper rubber 42 in a state sandwiching the worm gear 40a and the wheel gear 40b of the left gear subassembly 40.

Then, the left holder 44 that houses this left housing 50 is assembled inside the left upper rail 20 as described above. When assembled in this way, the worm gear 40a of the left gear subassembly 40 protrudes from the opening 22, so the other end of the left shaft 34a is able to be fastened to this protruding worm gear 40a. The electric drive mechanism 30 is formed in this way. The left and right lower rails 10, the left and right upper rails 20, and the electric drive mechanism 30 together form the power slide device 4.

Continuing on, the operation of the vehicle seat 1 provided with this power slide device 4 will be described. When driving the motor 32, the left and right nuts 38 rotate via the left and right shafts 34 (i.e., the left shaft 34a and the right shaft 34b), and the left and right gear subassemblies 40 (i.e., the left worm gear 40a, the left wheel gear 40b, the right worm gear 40a, and the right wheel gear 40b). As a result, the rotated left and right nuts 38 move with respect to the left and right screws 36, so the left and right upper rails 20 are able to slide electrically on the left and right lower rails 10.

The vehicle seat 1 according to the example embodiment of the invention is formed as described above. According to this structure, the bottom piece 62 of the front bracket 60 is crimped to the bottom surface 10a of the lower rail 10. The rubber damper 70 having the through-hole 72c is assembled to this front bracket 60. The front end of the screw 36 is inserted into the through-hole 72c. Therefore, the front end of the screw 36 is inserted into only the through-hole 72c of the rubber damper 70. That is, the front end of the screw 36 is not inserted directly into the front bracket 60. Therefore, unlike the related art, the deflectable amount that the rubber damper 70 is able to bend will not end up decreasing (in other words, the deflectable amount that the rubber damper 70 is able to bend will increase). As a result, even if amount of rattling produced in the screw 36 is large, this large amount of rattling is able to be absorbed.

Also, with this structure, the front bracket 60 is formed so as to form a general L-shape by the bottom piece 62 and the rising piece 64 that has the through-hole 64a. The generally conical protrusion 78 is formed protruding toward the front side of the rubber damper 70, on the rubber damper 70. The protrusion 78 of the rubber damper 70 is inserted into the through-hole 64a in the rising piece 64 of the front bracket 60. In this way, the rubber damper 70 is assembled to the front bracket 60 through the insertion of the protrusion 78. Therefore, this assembly is able to be performed easily.

Also, with this structure, when the rubber damper 70 (i.e., the engaging body 74) is assembled to the front bracket 60, the arcuate portion 72d that protrudes in an arc-shape corresponding to the recessed portion 64c of this front bracket 60, is formed on a lower edge of the front side of the retaining body 72 of the rubber damper 70. Therefore, when assembling the rubber damper 70 to the front bracket 60, the arcuate portion 72d of this assembled rubber damper 70 is supported by the recessed portion 64c of the front bracket 60. Thus, the rubber damper 70 is supported at two points (the protrusion 78 and the arcuate portion 72d) with respect to the front bracket 60, so compared to when the rubber damper 70 is supported at only one point (the protrusion 78), a load applied by an occupant seated on the seat cushion 2 is able to be dispersed. As a result, the rubber damper 70 is able to last for a long time.

Also, with this structure, when attaching the rubber damper 70 (i.e., the engaging body 74) to the front bracket 60, the surface 64b of the rising piece 64 of the front bracket 60 is set in a position so as to form a recess from (i.e., is set back from) the front surface 72a of the retaining body 72 of this rubber damper 70. Therefore, the retaining body 72 is in a state protruding forward in a manner covering the rising piece 64 of the front bracket 60. Thus, the front bracket 60 does not protrude out from the rubber damper 70. As a result, harm caused by the front bracket 60 is able to be inhibited. Also, the appearance of the front bracket 60 with the protrusion 78 of the rubber damper 70 inserted into the through-hole 64a in the rising piece 64 is able to be improved.

The content described above relates to only one example embodiment of the invention. The invention is in no way limited to this content.

In the example embodiment, the vehicle seat 1 is given as an example of the vehicle seat of the invention. However, the vehicle seat is not limited to the vehicle seat 1. That is, the vehicle seat may be a seat of any of a variety of types of vehicles, such as a seat of a marine vessel, a seat of an aircraft, or a seat of a railcar, or the like.

Also, in the example embodiment, the depth of the recess of the front surface 74a of the engaging body 74 with respect to the front surface 72a of the retaining body 72 of the rubber damper 70 is set greater than the thickness of the rising piece 64 of the front bracket 60, but is not limited to this. The depth of the front surface 74a of the engaging body 74 with respect to the front surface 72a of the retaining body 72 of the rubber damper 70 may also be set the same as the thickness of the rising piece 64 of the front bracket 60. In this case as well, similar operation and effects are able to be obtained.

Also, in the example embodiment, the front bracket 60 is given as an example of the protruding portion of the invention, but the protruding portion is not limited to this. The protruding portion may also be a partially cut out and bent up piece that has been partially cut out from the bottom surface 10a of the lower rail 10 and bent up.

Also, in the example embodiment, the worm gear 40a is rotated by the driving force of the motor 32, but it is not limited to this. That is, the worm gear 40a may also be rotated by manually operating a handle or the like, not shown, that is connected to the worm gear 40a.

Also, in the example embodiment, the rubber damper 70 is formed by the retaining body 72 that has the through-hole 72c that passes between the front surface 72a and the rear surface 72b of the retaining body 72, and into which the screw 36 is able to be inserted and retained, and the engaging body 74 that has the generally conical protrusion 78 that is lined up with the lower side of this retaining body 72 and is able to engage with the front bracket 60. That is, the retaining body 72 and the engaging body 74 are lined up one above the other (i.e., vertically), but they are not limited to this. The retaining body 72 and the engaging body 74 may also be lined up one beside the other (i.e., laterally), or may be lined up one in front of the other (i.e., longitudinally).

Also, in the example embodiment, the insertion direction of the front end of the screw 36 into the through-hole 72c in the rubber damper 70 and the insertion direction of the protrusion 78 of the rubber damper 70 into the through-hole 64a in the front bracket 60 match, but they are not limited to this. That is, these insertion directions may also be different.

What is claimed is:

1. A slide rail of a vehicle seat, comprising:
   a first rail to which a screw, having a screw thread provided on an outer periphery of the screw, is fixed;
   a second rail that retains a nut into which the screw screws, the second rail being configured to move relative to the first rail by the nut rotating;
   a protruding portion that is provided on the first rail and protrudes toward the screw; and
   an elastic member that connects the protruding portion and the screw, wherein
   the elastic member has a retaining body that retains the screw and an engaging body that engages with the protruding portion, and
   the protruding portion is provided with a through-hole and only the engaging body passes through the through-hole so as to engage with the protruding portion.

2. The slide rail according to claim 1, wherein
   the protruding portion has a L shape that includes a bottom piece and a rising piece that includes the through-hole;
   a protrusion protrudes from the engaging body of the elastic member; and
   the elastic member is assembled to the protruding portion by the protrusion being inserted into the through-hole in the rising piece of the protruding portion.

3. The slide rail according to claim 2, wherein
   when the elastic member is assembled to the protruding portion, the retaining body of the elastic member is supported by an upper edge of the rising piece of the protruding portion.

4. The slide rail according to claim 2, wherein
   when the elastic member is assembled to the protruding portion, the retaining body of the elastic member protrudes from the rising piece of the protruding portion toward a side opposite a side where the elastic member is assembled to the rising piece.

5. The slide rail according to claim 1, wherein
   the retaining body and the engaging body are vertically aligned.

6. The slide rail according to claim 1, wherein
   the retaining body is provided adjacent to a face defining an outer periphery of the protruding portion.

7. The slide rail according to claim 6, wherein
   the retaining body is supported by a recessed portion provided on the outer periphery of the protruding portion.

8. The slide rail according to claim 1, wherein
   the engaging body includes a protrusion provided in the through-hole of the protruding portion,
   the retaining body includes a through-hole that receives the screw therein, and
   a portion of the protruding portion is disposed between the protrusion of the engaging body and the through-hole of the retaining body.

* * * * *